R. M. CATLIN.
METHOD OF MAKING DECOLORIZING MATERIALS.
APPLICATION FILED APR. 25, 1916.
1,219,438. Patented Mar. 20, 1917.
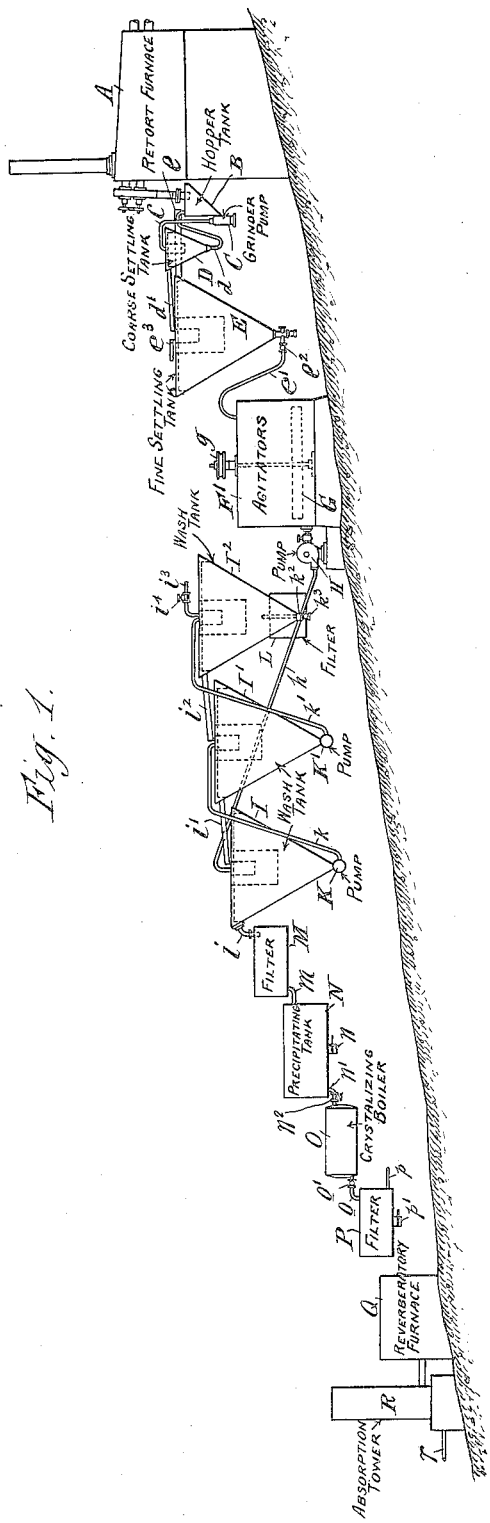
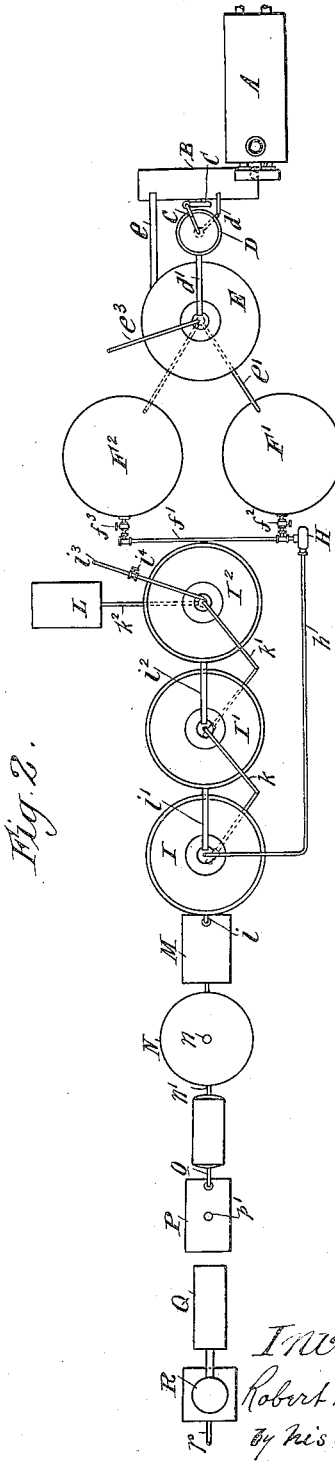
Inventor:
Robert M. Catlin
by his Att'ys:
Philipp Sawyer Rice & Kennedy

UNITED STATES PATENT OFFICE.

ROBERT M. CATLIN, OF FRANKLIN FURNACE, NEW JERSEY.

METHOD OF MAKING DECOLORIZING MATERIALS.

1,219,438.  Specification of Letters Patent.  Patented Mar. 20, 1917.

Application filed April 25, 1916. Serial No. 93,414.

*To all whom it may concern:*

Be it known that I, ROBERT M. CATLIN, a citizen of the United States, residing at Franklin Furnace, county of Sussex, and State of New Jersey, have invented certain new and useful Improvements in Methods of Making Decolorizing Materials, fully described and represented in the following specification and the accompanying drawings, forming a part of the same.

This invention relates to a method of making a material having a high decolorizing power.

The object of the invention is to provide a process by which there may be produced a product having a relatively high decolorizing power, which product can be manufactured in large quantities at a reasonable price.

The invention will be described in connection with the accompanying drawings, which show an apparatus suitable for carrying out the process in a commercial way.

In the drawings—

Figure 1 is a diagrammatic side view, and Fig. 2 is a diagrammatic plan view.

In the best embodiment of the new process, the starting material is a certain residue obtained from the distillation of shale, this distillation being carried out for the purpose of extracting from the shale materials and gases which can be driven off by heat.

Such residual material contains considerable quantities of carbon, and generally contains, also, silicon dioxid and alumina, together with small amounts of other ingredients, such as iron, magnesium and calcium.

One such shale residue, which may be cited as typical, gave the following analysis:

| | |
|---|---|
| $SiO_2$ | 58.53 |
| $Fe_2O_3$ | 9.01 |
| $Al_2O_3$ | 8.43 |
| $MgO$ | .53 |
| $CaO$ | 1.05 |
| $C$ | 21.14 |

In carrying out the process to produce the new decolorizing material, the starting material is comminuted in any suitable way to obtain a fine material. In practice, the starting material is ground with water and then graded in a settling tank, the coarse material being passed back to the grinder, while the fine material is carried off with the water to a second settling tank, where it is allowed to settle.

The fine material obtained as above described or in any other suitable way, is subjected to the action of hydrofluoric acid (HF).

The hydrofluoric acid appears to react with the starting material in two ways, viz., first, it acts so as to reduce the proportion of the constituents other than carbon and thereby render such constituents soluble so that they may be subsequently removed by washing; second, it seems to confer the decolorizing power upon the solids remaining, which constitute the final product. From a series of experiments made by me, the decolorizing power seems to be so proportioned to the amount of product obtained from the starting material as to indicate that it is not due wholly to the decolorizing power of the carbon alone. For example, analysis of some typical products show that the constituents are chiefly carbon and silica. The amount of silica present in the final product seems to be determined by the amount of hydrofluoric acid used in treating the starting material and the conditions under which said material was treated, as, for example, the temperature and the amount of agitation. By controlling this treatment, the amount of material other than carbon in proportion to the carbon may be varied, so that the final product may constitute any desired proportion of the original starting material. If the decolorizing power of the final product were due only to the carbon in such product, the power would be in proportion to such carbon. My experiments have shown that this is not the fact, and that the decolorizing power of the final product seems to be such that it can be calculated approximately by assuming that the carbon present has a decolorizing power of between 80 and 90, and that all the other materials accompanying the carbon have a decolorizing power of between 60 and 80. A series of products produced by me have shown decolorizing powers which could be calculated approximately by assuming a decolorizing power of the carbon of about 90 and of all the other materials of about 70. Consequently, it is found that only a relatively small amount of hydrofluoric acid may be employed in treating the starting materials, and that a product may be obtained which is a relatively large proportion of the starting material, while at the same time the decolorizing power is relatively high.

It has been found that the degree of concentration of the acid and the total amount of hydrofluoric acid relatively to the amount of starting material, materially affects the nature, and also the quantity, of the resultant product. The less the amount of acid in proportion to the starting material, the greater will be the quantity of the decolorizing material obtained, and, of course, its decolorizing power will be lower, but will still be high enough for commercial purposes. Of course, if the treatment with acid is so slight as to dissolve but little silica, the proportion of the final product to the starting material may be very large, but the decolorizing power will not be sufficiently developed. The decolorizing power of the starting material is relatively small, and the acid treatment should be sufficient to bring about the desired increase in power of the product.

As one example, it may be stated that a 20% hydrofluoric acid solution added to the starting material in such a proportion that the hydrofluoric acid was 95.6% by weight of the starting material, gave a product which, when washed and separated, amounted to about 29% by weight of the original starting material and had a decolorizing power of about 81. A 10% solution of hydrofluoric acid, used so that the proportion of hydrofluoric acid to the starting material was the same as before, gave a product amounting to about 56.3% by weight of the starting material, with a decolorizing power of about 74.2.

The amount of acid to be used in proportion to the starting material is dependent upon the amount of product which it is desired to obtain relatively to the starting material.

The time of the reaction depends upon the temperature of the solution, since a hot solution will generally react more rapidly than a cold solution. Furthermore, it has been found that agitation in any suitable way increases the rapidity of the reaction.

Upon the completion of the reaction, the solids of the mixture are washed thoroughly to free them from any soluble fluorids or free hydrofluoric or hydrofluosilicic acids. If desired, the solids may be separated from the liquid in any suitable way, as by filtration or settling and decantation, and then washed with water. However, in carrying out the process commercially, it is better to displace the liquids by supplying wash-water directly to the mixture of solids and liquids, at the end of the reaction, and thereby gradually wash away from the solids the soluble matters and any remaining acid. The solids are then settled out from the wash-water and separated from any accompanying liquid by filtration. The solids thus obtained are ready for the market.

The product as above obtained is an excellent decolorizer and, on account of its low cost of production, has an extensive application in the arts.

While it will vary somewhat in composition according to the nature of the starting material from which it is made, its chief ingredients seem to be carbon and silica, the latter apparently being in some form which assists the carbon in the decolorizing action.

A typical product made as hereinbefore described with a 16% solution of HF from a starting material of the type referred to hereinabove, gave the following analysis:

| | |
|---|---|
| C | 42.97 |
| $SiO_2$ | 52.04 |
| Other constituents in traces | 4.99 |

The decolorizing power of this particular product was 79.6. When this product was burned, the remaining ash amounted to 57% by weight of the original product.

The material, of course, gradually loses its decolorizing power with use, but may be readily regenerated in any suitable way, as, for example, by heating without access of air, or preferably by subjecting it again to the action of hydrofluoric acid, and then washing and filtering as before. In fact, this method of regenerating the decolorizing material with HF is of value even with old types of decolorizing material, such as bone-black or other carbons, and this part of the invention is not to be considered as limited to the specific product from shale residue.

The drawings show one form of apparatus suitable for carrying out the process in a continuous way and on a large scale.

In this drawing, A indicates any suitable retort furnace by which shale may be heated to drive off the hydrocarbons which it contains. The shale residues are discharged from the furnace into a suitable receptacle, as, for example, a hopper tank B to the bottom of which is connected a suitable grinder and pump, as indicated at C, which serves to grind the material and also to pump it through a discharge pipe c into the top of a settling tank for settling coarse material. This is a conical tank, as indicated at D. It has its top arranged at a higher level than the top of the hopper tank B, and its bottom is connected to a pipe d arranged to discharge into the top of the hopper tank B. Furthermore, the coarse settling tank D has an overflow conduit d' arranged to discharge into a conical settling tank E which serves to settle fine material. This fine settling tank has an overflow e which may lead back to the top of the hopper tank B and also has a bottom discharge to which is connected a movable discharge pipe $e'$ controlled by a valve $e^2$. This pipe may be so arranged that its outer end may be moved to discharge into either one of two mixing tanks $F'$, $F^2$.

The apparatus comprising the grinder pump C, the tanks B, D and E, and the various connections constitute means for producing a finely comminuted material. The settling tanks D and E are advantageously of the type shown, in which the material supplied to each tank is admitted to the central upper portion, and suitable protecting cylinders surround the inlet to minimize the disturbing influence of the inflowing material on the body of the liquid in the tank. Water is supplied to this comminuting and grading apparatus at any suitable point, as, for example, through an inlet pipe $e^3$ leading to the tank E. The shale refuse, dropped from the retort into the water in the tank B, is already in a condition where it may be acted upon by the combined grinder and pump.

By this apparatus it is broken up and then pumped to the coarse settling tank D. Here the coarse material settles and is returned to the tank B. The fine material is carried off by the outflowing water to the fine settling tank E, where the fine material settles to the bottom and is discharged into the particular mixing tank F or $F'$, with which the discharge $e'$ at that time communicates.

By means of the overflow $c$ at the top of the fine settling tank E, the water drawn from the tank B by the grinder pump C is continuously returned to said tank B. The water supply to the tank E through the supply pipe $e^3$ is so adjusted that it will maintain the level of liquid in the tank E at the desired height.

The mixing tanks are intended to be used alternately. Each is provided with suitable means for agitating materials therein. In the present example, this agitating means is shown as stirrers, one for each tank, each stirrer G having a vertical shaft with a drive wheel $g$ at its upper end, to which power may be applied to drive the agitator.

When one of the mixing tanks ($F'$ or $F^2$) is filled, the discharge pipe $e'$ is shifted to the other tank. The agitator of the filled tank is started and a charge of hydrofluoric acid is added in such an amount that the resultant mixture will have the desired strength. In practice, it has been found that the best limits of strength are from 10% to 40%, and owing to the fact that at a concentration of about 16% the quantity of the product is much greater, while its decolorizing power is not greatly lessened, it is very advantageous to work with a solution of about 16%. The agitation of the mixture is continued for some time and usually until the desired reaction is completed.

From the mixing tank, the mixture of liquid and solid materials is pumped to a suitable washing and separating apparatus which, in the present example, comprises a series of settling tanks indicated, that is to say, conical tanks, each of which has a bottom discharge and a cylinder or cylinders surrounding the inlet at the center of the upper portion. In the present example, three such tanks are shown, as indicated at I, $I'$, $I^2$. The discharge outlets of the mixing tanks $F'$, $F^2$ are connected to a pipe $f'$, and controlled by valves $f^2$, $f^3$, respectively. To one end of the pipe $f'$ is connected the suction side of a pump H, whose discharge end is connected to a pipe $h$ leading to the center of the upper portion of the washing tank I, the bottom of which is connected through a pump K, and a pipe $k$ to the top of the next tank $I'$, which in turn has its bottom connected by a pump $K'$ and pipe $k'$ to the top of the third tank $I^2$. The bottom of the latter tank is connected by a pipe $k^2$ to a filter device of any desired type, as indicated at L. The pipe $k^2$ is controlled by a suitable valve, as indicated at $k^3$.

The tanks I, $I'$, $I^2$ are arranged at progressively higher elevations in the order named, and each has an overflow at $i$, $i'$, and $i^2$. The overflow $i^2$ leads to the center of the next tank $I'$, and the overflow $i'$ leads to the center of the tank I. The overflow from the tank I leads to a filter device M. The center of the tank $I^2$ is supplied continuously with wash-water through a pipe $i^3$, controlled by a suitable valve $i^4$.

From the filter M the filtrate passes to apparatus for the recovery of hydrofluoric acid. In the present example, this comprises a precipitating tank N, a crystallizing boiler O, a second filter P, a suitable furnace, as, for example, the reverberatory furnace Q, and absorption tower R.

The filter M is arranged to discharge its filtrate through a pipe $m$ to the precipitating tank N, which has a perforated false bottom, as shown. The tank is provided with an outlet for the precipitates, controlled by a valve $n$, and also has a liquid discharge leading from below the filter bottom of the tank N, as indicated at $n'$, whereby liquid may be drawn from the precipitate. The liquid discharge connects with the upper part of the boiler O and is controlled by a valve $n^2$. The boiler O has a discharge outlet $o$ leading from its bottom to the top of the filter P, and controlled by a valve $o'$. The filter P has a liquid discharge $p$ through which the filtrate or liquid is wasted, and also has a discharge for solids, indicated at $p'$, arranged to be closed in any suitable way.

The furnace Q has a discharge pipe arranged to lead gases to the absorption tower R, which is of any usual construction. The acid is led from the tower to suitable storage tanks through a discharge conduit $r$.

In the usual practice, the contents of a mixing tank, after the completion of the reaction, is pumped to the first tank I, where the first washing and first settlement of solids occurs. The thicker mixture is pumped from the bottom of tank I to the top of tank I', in which a further washing and further settlement takes place. From this tank the thickened mixture is pumped to the top of the tank $I^2$, when the final washing and settling take place. With the valve $k^3$ open, the thickened mixture is continuously discharged to the filter L where the solids are separated from the wash-liquid and are ready for the market.

The wash-water is continuously supplied in a regulated quantity to the tank $I^2$, and by means of the overflows from each tank to the next adjacent one, a counterflow of liquid takes place with a final overflow at a regulated rate to the filter M. This filter serves to separate out small amounts of fine solids which may have floated off with the overflow from the tank I. The filtrate is led to the precipitating tank N, where aluminum oxid ($Al_2O_3$) is added in sufficient quantity to precipitate silica ($SiO_2$) and other impurities. The supernatant liquid is decanted off to the crystallizing boiler, where it is heated under pressure, with the result that the aluminum fluorid ($AlF_3$) crystallizes. From this boiler, the entire contents are discharged to the filter, which separates the crystalline mass from the liquid, the latter being wasted, while the solids removed from time to time are charged into the reverberatory furnace, and the hydrofluoric acid driven off as a gas which is absorbed in the absorption tower by a suitable flow of water, the solution of HF thus obtained being drawn off at the bottom of the tower.

Instead of recovering the hydrofluoric acid in the well known manner hereinbefore described, other suitable methods may be employed. For example, the filtrate from the filter M may be treated with caustic soda (NaOH) or sodium carbonate ($Na_2CO_3$) to precipitate the silica ($SiO_2$), after which the supernatant liquid may be removed and treated in any suitable way for the recovery of the fluorin. For example, the said supernatant liquid may be evaporated and the crystals removed and subjected to heat to drive off the fluorin.

Throughout the specification, the decolorizing power of the product has been given on a scale which is intended to indicate the percentage of color removed by the product. In the determination of this scale, a very dark solution of lowest grade Porto Rican sugar (45 Brix) was employed as the standard. A sample of this was subjected to the decolorizing action of about 5% of the new product, and then this partly decolorized sample was placed side by side with a known quantity of a sample of the original product and the latter gradually diluted with water of known amount until the colors of the two samples were identical. The amount of water added to the original sample and the quantity of the original sample, enabled a determination to be made as to the amount of color material removed by the product.

On this scale the best processed bone coal, tested with the same solution and in the same percentage, gave a value of 69, so that the figures given in this specification as to the decolorizing power of the new product are on a scale comparable with bone-black at 69.

What is claimed is:

1. The process of making a material having decolorizing properties, which consists in acting upon a carbonaceous residue of an industrial carbonizing process with hydrofluoric acid, and then recovering the solids.

2. The process of making a material having decolorizing properties, which consists in acting with hydrofluoric acid upon a starting material comprising silica and a carbonaceous material obtained from an industrial carbonizing process, and then recovering the solids.

3. The process which consists in subjecting a residue of shale distillation to the action of hydrofluoric acid.

4. The process of making a material having decolorizing properties, which consists in subjecting the carbonaceous residue of an industrial carbonizing process to the action of dilute hydrofluoric acid, and then recovering the solids.

5. The process of making a material having decolorizing properties, which consists in subjecting a starting material comprising silica and a carbonaceous material obtained from an industrial carbonizing process to the action of dilute hydrofluoric acid, and then recovering the solids.

6. The process which consists in subjecting a residue from shale distillation to the action of dilute hydrofluoric acid.

7. The process which consists in subjecting an inorganic residue of shale distillation to the action of hydrofluoric acid and then washing the solids of the reaction.

In testimony whereof, I have hereunto set my hand.

ROBERT M. CATLIN.